May 29, 1956     L. A. WEBBER     2,748,180
BUTENE-1 SEPARATION IN THE PRESENCE OF AN ANTIFOAM AGENT
Filed Jan. 5, 1953
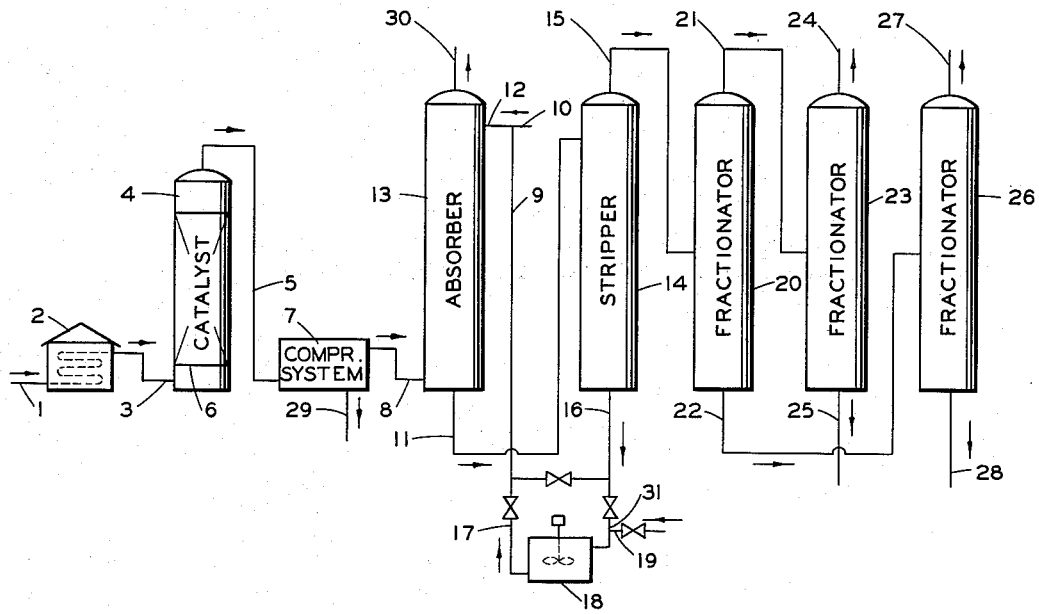
INVENTOR.
L. A. WEBBER
BY *Hudson & Young*
ATTORNEYS United States Patent Office 2,748,180
Patented May 29, 1956

2,748,180

BUTENE-1 SEPARATION IN THE PRESENCE OF AN ANTIFOAM AGENT

Ludwig A. Webber, Borger, Tex., assignor to Phillips Petroleum Company, a corporation of Delaware Application January 5, 1953, Serial No. 329,533

9 Claims. (Cl. 260—683.3)

This invention relates to fractional distillation. In one aspect this invention relates to improved methods for obtaining separations by fractional distillation between hydrocarbons having relatively close boiling points. In another aspect it relates to a method for obtaining improved separations by fractional distillation between hydrocarbon components having close boiling points wherein the feed stock for the distillation is obtained from a mineral seal oil absorption operation.

The use of mineral seal oil as an absorption oil is a common expediency in natural gasoline plants, in many oil refining operations and in chemical manufacturing operations. Probably the more common use of mineral seal oil as an absorption oil is in the extraction of gasoline boiling range hydrocarbons from natural gases. In such operations it is common practice to pass in countercurrent relation a natural gas to be extracted and the mineral seal oil in an elongated and vertically disposed vessel provided with liquid-vapor contacting elements. During the flow of the mineral seal oil from the top to the bottom of the extraction vessel the oil absorbs the condensable hydrocarbons from the gas. The rich absorption oil is then removed from the bottom of the absorption vessel and heated and then introduced into the upper portion of a stripper. In the stripping vessel the gases or vapors pass upward in countercurrent direction to down flowing rich absorption oil. In this operation the absorbed hydrocarbons are removed from the absorption oil. From the bottom of the stripper the absorption oil, depleated of its absorbed constituents, is removed and is cooled and then reintroduced into the absorber to complete the cycle. The stripped vapors which usually contain steam are removed from the top of the vessel and passed through condensers into fractionators for separating into products. When it is desired to fractionate the recovered hydrocarbons difficulties may arise when it is desired to make a cut between two close boiling hydrocarbons.

I have found by adding an antifoam agent to the mineral seal oil used in the absorber that it is possible to obtain considerably improved fractionation of stripped hydrocarbons in the fractionator following the stripper vessel.

Another application of my invention is in the separation of close boiling hydrocarbons resulting from the catalytic dehydrogenation of normal butane, for example, in the manufacture of butadiene for synthetic rubber purposes. In an operation of this type a normal butane feed is catalytically dehydrogenated to produce butene. In this catalytic operation other hydrocarbons than the desired butene or butenes are ordinarily produced and such other hydrocarbons have to be separated from the butenes prior to their dehydrogenation to butadiene. Such materials as normal butane, butadiene, butene-1, butene-2, both high and low boiling isomers, present considerable difficulties when it is desired to separate these by fractional distillation. In such an operation and prior to the actual separation and recovery of the individual $C_4$ hydrocarbons it is desirable to remove the propane and lower boiling materials. The use of a mineral seal oil absorption system in the recovery of the $C_4$ hydrocarbons from such a catalytic dehydrogenation effluent material is a common expedient. In such an operation propane and lower boiling hydrocarbons including propylene, ethane, ethylene, methane and hydrogen are removed as the off-gas from the absorber. The mineral seal absorption oil in this operation then contains largely normal butane, butene-1, butene-2, and some butadiene in addition to other higher boiling materials. In a first fractionator following the mineral seal oil stripping column a cut is made between butene-1, butadiene and propane and the lower boiling hydrocarbon on the one hand and normal butane and butene-2 and higher boiling hydrocarbon on the other hand. It is found that in such a fractional distillation operation it is very difficult to keep all of the normal butane in the kettle product and at the same time recover all of the butene-1 and butadiene in the over-head product. Any normal butane which passes overhead with the butene-1 and butadiene is ordinarily lost with a stream of propane and lower boiling materials since economics does not permit subsequent treatment for this normal butane recovery. However, when all or substantially all of the normal butane is retained in the fractionator bottoms, the products, then consisting largely of normal butane and butene-2 with some higher boiling hydrocarbons, are fractionated in the subsequent fractionation operation for removal of $C_5$ and higher boiling hydrocarbons. In this operation the normal butane and butene-2 pass overhead and this stream contains sufficient normal butane for its recovery especially in view of the fact that processwise it is preferable to recover the butene-2 for subsequent operation. Since it is necessary to recover the butene-2 as substantially pure hydrocarbons for subsequent treatment, the normal butane is recovered from this operation and is recycled into the original normal butane dehydrogenation step. As mentioned above it is not economically feasible however to use an additional step for the recovery of the normal butane which passes out with the propane and lower boiling hydrocarbons from the above mentioned fractionation operation.

An object of my invention is to provide a method for improving fractional distillation operations for obtaining a sharp cut between close boiling hydrocarbon.

Another object of my invention is to provide a method for operating an absorber-stripper plant in order to obtain efficient fractionation of stripper overhead material.

Still other objects and advantages of my invention will be realized upon reading the following description which taken in conjunction with the attached drawing forms a part of this specification.

In achieving these and other objects I have devised a method for the operation of an absorber-stripper plant which yields a stripper overhead material which can be efficiently fractionated to make a sharp cut between close boiling components.

The figure represents in diagrammatic form one arrangement of apparatus parts for carrying out the process of my invention.

In practicing my invention I have found that improved fractionator operation results when an anti-foam material is added to the mineral seal oil used in the absorption operation. I believe that such improved operation results from the use of an anti-foam material in that absorption oil is not permitted to pass overhead from the stripper with the stripped hydrocarbons. It is further believed that in conventional operations the presence of mineral seal oil constituents in stripper over-head materials seriously interferes with subsequent fractionation operations in that a close or sharp cut cannot ordinarily be made between close boiling constituents.

In the figure, a normal butane feed stock from a source, not shown, is passed from line 1 into a furnace 2 for heating to such a temperature as is required in a following catalytic dehydrogenation operation. This heated butane is passed from the heater tubes through a line 3 into the lower portion of a vessel 4 containing a dehydrogenation catalyst 6. Such a dehydrogenation catalyst as is useful in an operation of this type need not be described in detail since such catalysts are well known in the art. The products of this dehydrogenation operation pass from the top of the catalyst vessel 4 through a line 5 into a compressor system 7. In this compressor system 7 these gaseous materials are compressed to a sufficiently high pressure for subsequent operations. During this compressing operation some condensation of relatively high boiling material occurs and such condensate is removed from this system through a condensate removal line 29. The compressed gases, properly cooled, pass on through a line 8 into an absorber 13. In this absorber a mineral seal oil is introduced into the upper portion from a line 12 and passes downward in countercurrent relation to upflowing gases. Gases not absorbed by the mineral seal oil are removed from absorber 13 through a residue gas line 30 for such disposal as desired. One disposal of such gases is treatment for recovery of hydrogen in case sufficient hydrogen is present to warrant such treatment. These gases may also be used as process fuel or boiler fuel if desired. Rich absorption oil is removed from the bottom of the absorber 13 and is passed through a line 11 and introduced into the top of a stripper 14. The rich absorption oil flows downward in the stripper 14 and is stripped of its absorbed material by steam or other gases and the stripped material and stripping steam or other gases are removed from this vessel through a line 15 for subsequent treatment. The absorption oil depleted of its previously absorbed hydrocarbons is removed from the stripper and is passed through a line 16 for introduction into the absorber by way of line 12 as mentioned hereinabove. In the rich oil line 11 may be disposed, if desired, one or more heat exchangers or other heater if desired. In like manner in line 16 may be disposed heat exchangers for cooling purposes since as is well known in the art absorption oil to be an efficient absorbent must be relatively cool.

In such butane dehydrogenation operation the stripped gases passing through the stripper overhead line 15 will ordinarily contain some unreacted normal butane, butene-1, butene-2, butadiene, and some propane and lower boiling hydrocarbon. This material may be cooled for condensation of steam prior to its introduction to a fractionator column 20. After this cooling operation and removal of the condensed water, the hydrocarbon material is introduced into about a mid-point of the fractionator column 20. After this cooling operation and removal of the condensed water, the hydrocarbon material is introduced into about a mid-point of the fractionator 20. In this fractionation operation it is desired to take overhead butene-1, butadiene, and the propane and lower boiling hydrocarbons. The bottoms material or kettle product will contain mainly the unreacted normal butane, the butene-2, and the C₅ hydrocarbons and higher boiling material not previously separated in the compressor system 7. The overhead material from this column 20 is introduced into another fractionation column 23 in which the propane and lower boiling materials are separated by fractional distillation from the butene-1 and butadiene. The kettle product containing this butene-1 and butadiene is removed from this latter fractionator and is passed through a line 25 to such disposal as desired, for example, to a subsequent operational step in a butadiene production plant. The overhead vapors from the fractionator 23 is removed therefrom and is passed through a line 24 for subsequent use as desired, for example, as a boiler fuel.

The bottoms from the fractionator 20 is removed therefrom and is passed through a line 22 to a fractionator 26 in which the normal butane and butene-2 are taken overhead from a bottoms product containing the C₅ hydrocarbon and higher boiling materials. This latter product is removed from column 26 and is passed through a line 28 to subsequent disposal as desired. The overhead material consisting of normal butane and butene-2 is removed through a line 27 and is passed therefrom to subsequent operational steps as desired.

In one butadiene production plant which includes operational steps similar to those herein described the stripper overhead material is fractionated in a column similar to column 20, which is termed a butene-1 column. In this column it is desired to make as sharp a cut as possible and take butene-1, butadiene, propane and lower boiling hydrocarbons overhead with normal butane and butene-2 as bottoms. In order to keep as much as possible of the butene-2 in the kettle product a substantial portion of the normal butane is lost in the overhead vapor. In such an operation as mentioned the usual loss of butane in this overhead product ranges from 8 to 10 per cent. Such a loss is quite substantial.

I have found by adding such an anti-foam material as a polydimethyl siloxane, called Dow-Corning Antifoam A, to the lean mineral seal oil from the bottom of the stripper 14 that the butane loss in the overhead vapors from the butene-1 column is reduced to an average of 4.4% over a period of time longer than a month.

To practice this invention a line 31 is attached to line 16 as illustrated in the drawing and a portion of the mineral seal oil flowing in line 16 is passed through line 31 into a mixing vessel 18. A quantity of the above mentioned antifoam material is introduced into this vessel 18 through lines 19 and 31. In this vessel the antifoam material and the mineral seal oil are mixed to produce a solution or an emulsion. In case the antifoam material is soluble in the mineral seal oil a solution is formed and in case the antifoam material is not very soluble in the oil a mixture of a solution and an emulsion will be produced. This mineral seal oil-antifoam mixture is then passed through lines 17, 9 and 12 into the absorber 13. As far as I am able to tell the operation of the absorber is not interfered with in any manner whatever. And in addition I am not able to observe any improved absorber operations resulting from addition of the antifoam material to the absorption oil.

Rich absorption oil containing the antifoam material is passed through line 11 and introduced into the top of the stripper 14. In this stripper steam from a pipe 32 is introduced into the bottom of the column to heat the absorption oil and assist in the stripping operation. As near as I can observe this stripping operation is not interfered with nor improved in any manner by addition of the antifoam material. However, in absorption-stripping plants using conventional mineral seal oil it is common practice to operate an absorption oil purification system in order to prevent accumulation of impurities or other undesired material in the absorption oil. In such an absorber-stripper operation as herein contemplated while I have not shown in the drawing nor described the operation of an absorption oil purification system it is intended that such a purification system be used in order to maintain the absorption oil free from deleterious materials. Materials which ordinarily are found in absorption oil are mechanical impurities, such as rust and metal, and gums and higher boiling materials resulting from continued heating of the absorption oil. Such materials frequently cause oils to foam and result in foaming troubles in both the stripper and the absorber. When an absorption operation is carried out with an absorption oil purifier such foaming troubles ordinarily do not occur.

I find by adding a quantity of the Dow Corning Antifoam A material to the mineral seal oil as stated above that I am able to reduce the losses of normal butane in the overhead product passing through line 21 from the butene-1 column 20 from about 8 to 10 per cent to about 4.4 per cent. This 4.4 per cent normal butane in this overhead material is an average percentage of butane content over a period of 1 month of plant operation.

Just exactly how this improvement occurs is not certain. However, I believe that this improved operation results in minimizing the foaming which does occur in the stripper 14 to such an extent that mineral seal oil mist is not carried overhead to line 15 and introduced into the fractionator 20. The presence of a small quantity of such high boiling oil as mineral seal oil markedly interferes with the fractional distillation of such materials as butene-1 and butadiene from normal butane and butene-2.

Another improvement observed in the operation of my invention is that when the Dow Corning Antifoam A material is used in the mineral seal oil there appears to be considerably less mineral seal oil carried overhead in the residue gases passing through line 30 from the top of the absorber. It is difficult to determine the actual content of the mineral seal oil carried overhead in such a gaseous product. It has been observed however by plant operators operating boilers that there appears to be less absorption oil in their boiler fuel gas when the Dow Corning Antifoam A material is used than when this material is not used. A number of different plant operators operating on different shifts over an extended period of time reported this same observation.

Since such an antifoam material as the Dow Corning Antifoam A is relatively non-volatile this material is retained to a large extent in the mineral seal oil and it is not lost from the absorber-stripper system.

The class of organo-silicon polymers which have been found effective in the process of my invention are represented by the empirical formula,

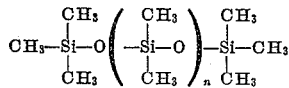

in which $n$ is at least one and may be classed as polydimethyl siloxanes. These compounds are colorless, odorless, inert liquids which vary in viscosity upwardly from about 1 centistoke at 25° C. to about a million centistokes. The polydimethyl siloxanes of honeylike consistency are found to be very effective for my purpose.

These siloxanes are used according to my invention in mineral seal oil in concentrations ranging from 1 to 20 parts per million, preferably from 3 to 15 parts per million.

Advantages obtained by the use of the antifoam material in a mineral seal oil according to my invention results in a lessened amount of mineral seal oil in the residue gases from the absorber, and a sharper fractionation between difficultly separable materials such as the butene-1 and the butadiene from the normal butane and butene-2 in the fractionator column following the mineral seal oil stripping operation.

As mentioned hereinbefore the use of such an antifoam material may be applied to other operations with results equal to those herein disclosed for an absorber-stripper operating in a butadiene production plant.

Valves, pumps, temperature and pressure indicating, recording and control devices have not been illustrated nor described for purposes of brevity. The need of such auxiliary equipment, its installation and operation are understood by those skilled in the art.

While certain embodiments of the invention have been described for certain illustrative purposes the invention obviously is not limited thereto.

Having described my invention I claim:

1. A process for manufacturing olefins from normal butane comprising the steps of catalytically dehydrogenating normal butane to said olefins whereby hydrogen and other hydrocarbons boiling above and below the boiling point of normal butane are produced, subjecting the dehydrogenation product to absorption conditions in the presence of a mineral seal oil containing a minor amount of a polydimethyl siloxane to produce a lean residue gas and a rich mineral seal oil, stripping said rich mineral seal oil of its absorbed hydrocarbon content to produce a lean mineral seal oil and stripped vapors, fractionating said stripped vapors to produce an overhead product comprising propane, butene-1, butadiene and a minor proportion of n-butane, and a bottoms product comprising butene-2, and n-butane of increased yield as another product of the process.

2. The process of claim 1 wherein the polydimethyl siloxane has the formula

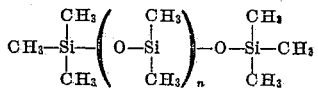

in which $n$ is at least one and said polydimethyl siloxane has a viscosity of at least one centistoke at 25° C.

3. The process of claim 1 wherein the polydimethyl siloxane is present in the mineral seal oil in a small but effective concentration to increase the yield of said bottoms product.

4. The process of claim 1 wherein the polydimethyl siloxane is present in the mineral seal oil in a concentration from 1 to 20 parts per million.

5. A method for improving the separation of n-butane and butene-2 from an effluent of a n-butane dehydrogenation operation comprising the steps of subjecting said effluent containing at least a minor amount of n-butane to liquid-gas countercurrent absorption conditions in the presence of a mineral seal absorption oil containing a minor but effective amount of a polydimethyl siloxane antifoam agent sufficient to improve said separation and having a viscosity of at least one centistoke at 25° C., from this operation removing a residue gas comprising $C_3$ and lower boiling hydrocarbons and hydrogen, and a rich mineral seal absorption oil containing absorbed hydrocarbons comprising n-butane and other $C_4$ hydrocarbons and a minor amount of hydrocarbons boiling below said $C_4$ hydrocarbons, stripping the absorbed hydrocarbons from the rich mineral seal oil, fractionating the stripped hydrocarbons in a subsequent operation to produce a butene-2 and n-butane bottoms product of increased n-butane yield based on the n-butane of the effluent feed to the absorption operation, and an overhead product comprising butadiene, butene-1, $C_3$ lower boiling hydrocarbons and a reduced yield of n-butane based on the n-butane of the effluent feed to the absorption operation.

6. A method for improving the fractionation of a mixture of hydrocarbons obtained from a mineral seal oil stripping operation comprising subjecting a mixture of volatile hydrocarbons to an absorbing operation in the presence of an absorbent mineral seal oil containing a minor but effective amount sufficient to improve said fractionation of a polydimethyl siloxane having a viscosity of at least one centistoke at 25° C., separating unabsorbed hydrocarbons as one product of the process from rich mineral seal oil containing absorbed hydrocarbons, stripping said absorbed hydrocarbons from said rich mineral seal oil, fractionating the stripped hydrocarbons into fractions of improved yield and purity as the main products of the process.

7. A method for recovering n-butane in increased yield from a mixture of gases containing n-butane comprising catalytically dehydrogenating n-butane to $C_4$ olefins, subjecting the dehydrogenation effluent to an absorption operation in the presence of an absorbent mineral seal oil containing a small but effective amount of a polydimethyl siloxane of at least one centistoke viscosity at 25° C., from this operation separating mineral seal oil enriched with absorbed hydrocarbons from a residue gas of substantially $C_3$ and lower boiling hydrocarbons and hydrogen, stripping the absorbed hydrocarbons from the enriched mineral seal oil, fractionating the stripped hydrocarbons thereby producing an overhead fraction of butene-1, hydrocarbons lower boiling than butene-1 and a minor amount of n-butane as another product of the process and a kettle intermediate product of butene-2 and n-butane, separating the butene-2 from the n-butane as another product of the process and recovering the n-butane as still another product in increased yield.

8. The process of claim 7 wherein the small but effective amount of said polydimethyl siloxane in the mineral seal oil is from 1 to 20 parts per million based on the mineral seal oil fed to the absorption operation.

9. In a process for manufacturing olefins from n-butane in which the major portion of said butane is catalytically dehydrogenated producing a first effluent comprising butene-1 and butene-2, hydrogen, unreacted n-butane, and other hydrocarbons, the $C_4$ and higher hydrocarbons in said first effluent are concentrated in the rich mineral seal absorption oil of an absorption process, said rich absorption oil is stripped to produce a $C_4$ concentrated second effluent, and said second effluent is fractionated into a third overhead effluent comprising substantially all of the butene-1 and a minor portion of the n-butane of said second effluent and a fourth effluent comprising substantially all of the butene-2 and the major portion of the n-butane of said second effluent, the improvement comprising reducing the amount of n-butane in said third effluent by about 50%, by adding a minor but effective amount of a polydimethyl siloxane having a viscosity of at least one centistoke at 25° C. to the lean absorption oil going to said absorption process.

References Cited in the file of this patent

UNITED STATES PATENTS

| | | |
|---|---|---|
| 2,416,504 | Trautman et al. | Feb. 25, 1947 |
| 2,449,427 | Thodos et al. | Sept. 14, 1948 |
| 2,474,014 | Seebold | June 21, 1949 |
| 2,544,564 | Peterson et al. | Mar. 6, 1951 |
| 2,632,726 | Ringham et al. | Mar. 24, 1953 |